United States Patent
Watanabe

[11] 3,775,673
[45] Nov. 27, 1973

[54] ELECTROMAGNETIC KARMEN VORTEX SENSING FLOW METERS

[75] Inventor: Masayasu Watanabe, Yokohama City, Japan

[73] Assignee: Hokushin Electric Works, Ltd., Tokyo, Japan

[22] Filed: Apr. 26, 1972

[21] Appl. No.: 247,828

[52] U.S. Cl............................ 324/34 FL, 73/194 B
[51] Int. Cl............................................. G01r 33/00
[58] Field of Search................... 324/34 R, 34 FL; 73/194 EM, 194 B, 194 C, 194 R

[56] References Cited
UNITED STATES PATENTS

| | | | |
|---|---|---|---|
| 3,110,876 | 11/1963 | Ramey et al.............. | 73/194 EM |
| 3,308,659 | 3/1967 | Herndon.................. | 73/194 EM |
| 3,677,082 | 7/1972 | Springston, Jr. et al....... | 73/194 EM |
| 3,691,830 | 9/1972 | Tomota et al................ | 73/194 B |

FOREIGN PATENTS OR APPLICATIONS
441,905   12/1966   Japan.................. 73/194 B Primary Examiner—Robert J. Corcoran
Attorney—Chittick, Thompson & Pfund

[57] ABSTRACT

In a Karman vortex flow meter of the type wherein a rod is inserted in fluid to be measured to create therein Karman vortices and a signal related to the vortices is detected to measure the flow velocity of the fluid, there are provided means contained in the rod for generating magnetic flux in the direction of the axis of the rod and a pair of electrodes mounted on the surface of the rod in contact with the fluid whereby to detect the magnetomotive forces including the variations in the velocity of the fluid caused by the Karman vortices created near the rod.

11 Claims, 19 Drawing Figures

ELECTROMAGNETIC KARMEN VORTEX SENSING FLOW METERS

BACKGROUND OF THE INVENTION

This invention relates to a flow meter utilizing Karman vortices.

In most of the prior art Karman vortex flow meters, a rod is inserted into a flow passing through a conduit, and the variation in pressure or velocity caused by the Karman vortices formed behind the rod is detected in terms of the variation in the temperature by means of a hot wire or a thermistor thereby counting the number of vortices. Since these systems detect temperature variations, it is impossible to use them at high temperatures. Furthermore, it is necessary to provide a temperature compensation. When liquids are used in these systems, the reliability of their mechanical strength is decreased. Moreover when these systems are used in liquids flowing through conduits having large diameters, their accuracy is degraded due to mud or other contaminants contained in the liquids.

To obviate these difficulties it has been proposed to detect the Karman vortices by electromagnetic means as disclosed in the specification of Japanese Pat. publication No. 20915 of 1967. According to the method disclosed therein, there are provided means for producing magnetic field or flux which intersects with the flow of fluid at right angles behind a Karman vortex generating member and a pair of electrodes for the conduit in substantially the same manner as in the well known electromagnetic flow meter. Thus, a sum of the mean velocity of the fluid and the variation in the flow velocity caused by the Karman vortices is detected by the electrodes. Accordingly, with this method as the mean velocity increases, the signal produced by the Karman vortices decreases with respect to the signal representing the mean velocity so that the amplifier utilized to amplify the output is liable to be saturated by the mean velocity signal thereby rendering it difficult to detect the variation in the flow velocity caused by the Karman vortex alone. Since the magnetic field generating means is located on the outside of the conduit as in the case of an electromagnetic flow meter, as the diameter of the conduit increases the cost of the magnetic field generating means becomes expensive which contradicts which the feature of the Karman vortex flow meter that simplifies the construction and reduces the cost.

SUMMARY OF THE INVENTION

It is an object of this invention to provide an improved eddy current flow meter which can be made to have a large diameter at low cost.

Another object of this invention is to provide a Karman vortex flow meter which can detect digitally the flow quantity without being affected by the contaminants contained in the fluid.

Still another object of this invention is to provide a Karman vortex flow meter requiring low input impedance thus simplifying the converter.

Yet another object of this invention is to provide an improved Karman vortex flow meter which is not affected by non-uniform conductivity of the fluid to be measured.

A further object of this invention is to provide a Karman vortex flow meter which has no temperature limitation.

Still further object of this invention is to provide a corrosion resistant and reliable Karman vortex flow meter.

According to this invention, in a Karman vortex flow meter of the type wherein a rod is inserted in fluid to be measured to create therein Karman vortices and a signal related to the vortices is detected to measure the flow velocity of the fluid, there are provided means contained in the rod for generating magnetic flux in the direction of the axis of the rod and a pair of electrodes mounted on the surface of the rod in contact with the fluid whereby to detect the magnetomotive forces including the variations in the velocity of the fluid caused by the Karman vortices created near the rod.

DESCRIPTION OF THE PREFERRED EMBODIMENTS

Figure 1:
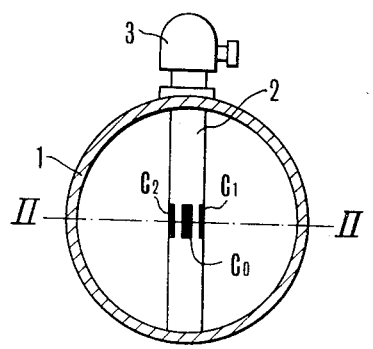
FIG. 1 is a cross-sectional view showing a basic construction of the novel flow meter.
Figure 2:
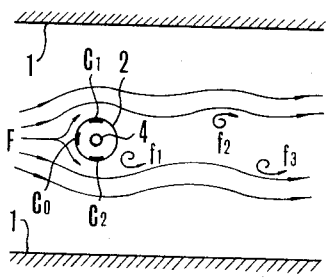
FIG. 2 is a longitudinal section taken along a line II — II in FIG. 1 showing a manner of generating Karman vortices.

Referring now to FIGS. 1 and 2 of the accompanying drawings, the flow meter of this invention comprises a conduit 1, a cylindrical rod 2 inserted in the conduit for generating Karman vortices and a pre-amplifier for amplifying a detected electrical signal. Electrodes $C_0$, $C_1$ and $C_2$ for contacting the liquid are mounted on the surface of the cylindrical rod at the central portion thereof.

As shown in FIG. 2, when liquid F flows from left to right, Karman vortices $f_1, f_2$ and $f_3$ are generated behind rod 2. Electrode $C_0$ is mounted on the rod 2 to directly oppose the flow of the liquid F, whereas electrodes $C_1$ and $C_2$ are disposed on a line perpendicular to the direction of flow of the liquid F in symmetric relation with respect to electrode $C_0$. Since electrode $C_0$ is grounded it is not always necessary to mount it on rod 3 but may be substituted by two metal rods which support rod 2. In certain cases electrode $C_0$ may be omitted. Magnetic field generating means 4 is contained in rod 2 for creating magnetic field in a direction parallel to the axis of the rod 2 on the outside thereof.

Figure 3:
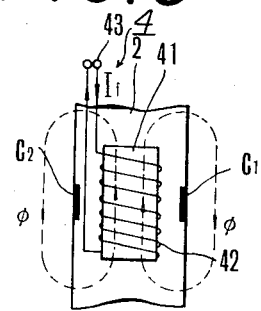
FIG. 3 is an enlarged longitudinal sectional view showing the construction of electrodes and magnetic field generating means.
Figure 4:
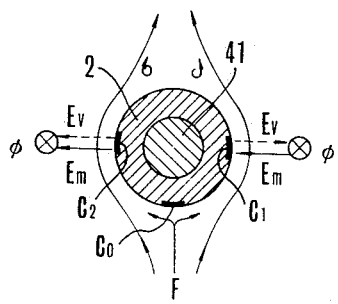
FIG. 4 is a cross-sectional view of the electrodes and the magnetic field generating means.

As best shown in FIGS. 3 and 4, the magnetic field generating means 4 comprises a magnetic core 41 coaxial with rod 2 and a coil 42 wrapped about core 41. When an AC or DC current $I_f$ is passed through the coil via terminals 43, magnetic flux $\phi$ is created outside the rod 2 in a direction parallel to the axis thereof. Then, as shown in FIG. 4, as the flux flows in the same direction (perpendicular to the plane of the sheet) on the opposite sides of electrodes $C_1$ and $C_2$, electromotive forces $E_m$ corresponding to one half of the mean velocity on the opposite sides of the rod 2 are created in electrodes $C_1$ and $C_2$ in the same direction with reference to electrode C.

According to the theory of Karman vortices, the deviations of the velocity caused by the Karman vortices from the mean velocity are opposite on the opposite sides of the axis of the rod 2 with reference to a plane including the axis of the conduit 1 and the rod 2, and the electromotive forces $E_v$ are opposite with reference to electrode $C_0$ as shown by dotted arrows. In this manner, the electromotive forces corresponding to the mean velocity and those caused by the Karman vortices have opposite directions with reference to the electrodes so that it is easy to identify only the electromotive forces caused by the Karman vortices.

Figure 5:
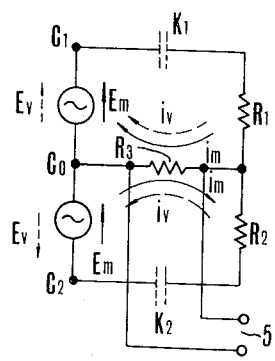
FIG. 5 shows a connection diagram of a measuring circuit.

More particularly, as shown in FIG. 5 when one interconnects electrodes $C_1$ and $C_2$ through two serially connected resistors $R_1$ and $R_2$ of equal value and couples a point intermediate of these resistors with electrode $C_0$ through a resistor $R_3$, the currents $i_m$ caused by electromotive forces $E_m$ related to the mean velocity will flow in the opposite directions through resistor $R_3$, thus cancelling with each other, whereas the currents $i_v$ caused by the electromotive forces $E_v$ related to the Karman vortices will flow in the same direction through resistor $R_3$, thus adding each other. Consequently, currents $i_v$ are added to produce a voltage drop $Z_{iv}·R_3$ related to the Karman vortices alone across output terminals 5.

Since this connection automatically eliminates useless signals $E_m$, even when the mean velocity increases, it is possible to take out only the necessary signal $E_v$ without causing saturation of the pre-amplifier. Where the coil 42 is excited by direct current, it is advantageous to insert capacitors $K_1$ and $K_2$ between resistors $R_1$ and $R_2$ and electrodes $C_1$ and $C_2$, respectively, as shown by dotted lines for preventing direct currents from flowing through resistor $R_3$. In this case, resistor $R_3$ will produce a pulsed signal corresponding to the differential of voltage $E_v$.

For the sake of simplicity, although the addition circuit for the signals $E_v$ is shown as comprising resistors $R_1$, $R_2$ and $R_3$ it should be understood the same object can also be attained by using capacitors, inductors or active elements such as transistors. Further, it is possible to eliminate the voltages $E_m$ by a suitable combination of a logic circuit and a feedback circuit.

As above described, the novel flow meter is constructed to electromagnetically detect the velocity of fluid, as can be noted from the foregoing description, the principle of operation is different from that of the conventional electromagnetic flow meter in that it does not detect the magnitude of the electromotive force proportional to the flow velocity but instead it detects the variation in the flow velocity due to Karman vortices in terms of frequencies. Thus, the feature of this invention lies in a digital detection. Accordingly, it is necessary for the electromotive forces to detect only the reversal of the flow velocity caused by the Karman vortices and any variation in the magnitude of the Karman vortex does not affect the result of measurement. For this reason it is not necessary to make so high the input impedance of a meter connected to receive the output signal of the flow meter as that of a converter for the electromagnetic flow meter. Moreover, it is not necessary to use any ratio computation for the purpose of preventing variations in the electromotive force caused by the variations in the source voltage. Thus, it is possible to use more simple and inexpensive converter than in the case of the electromagnetic flow meter.

In the electromagnetic type flow meter disclosed in Japanese Pat. publication No. 20915 of 1967, the S/N ratio increases with the increase in the mean velocity, thus making it difficult to detect the Karman vortices and saturating the amplifier. However, since this invention eliminates these difficulties, it is possible to construct flow meters of large diameters at low cost.

When compared with the Karman vortex flow meter of the hot wire type it is possible to obtain flow meters not affected by the contaminants contained in the fluid whereby the field of application can be widened.

Furthermore, as the flow meter of this invention digitally detects the signal it is necessary to detect only the polarity of the electromotive force in relation to the Karman vortices so that the magnetic field may be small.

Accordingly, the magnetic field generating means may be of small size thereby making it possible to construct flow meters of small size with small rods.

Figure 6:
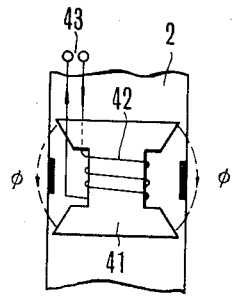
FIG. 6 shows a modified magnetic core.

FIG. 6 shows a modified construction of the magnetic core 41 wherein the core is constructed as a bobbin for the purpose of miniaturizing the same.

Figure 7:
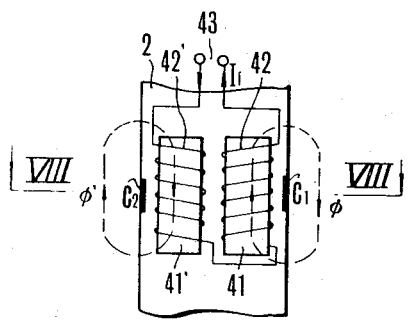
FIG. 7 shows another modification of the magnetic field generating means.
Figure 8:
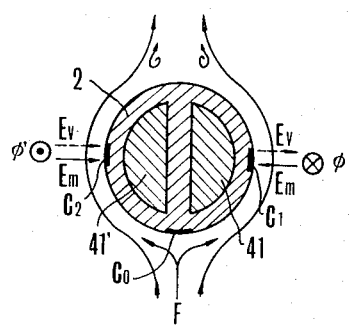
FIG. 8 shows a cross-sectional view of the magnetic field generating means shown in FIG. 7 taken along a line VIII — VIII.
Figure 9:
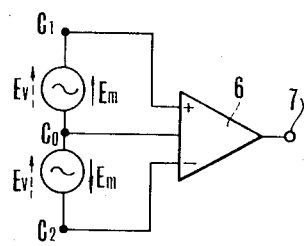
FIG. 9 shows a differential amplifier utilized in the modification shown in FIGS. 7 and 8.

FIG. 7 shows another modification wherein magnetic fluxes $\phi$ and $\phi'$ on the sides of electrodes $C_1$ and $C_2$ are made to have opposite directions. In this case, the magnetic field generating means comprises two magnetic cores 42 and 42' and coils 42 and 42' through which the exciting current is passed in opposite directions. The electromotive forces produced in this modified embodiment have opposite directions as those in FIG. 2. More particularly, the electromotive forces $E_m$ relating to the mean current are opposite, whereas electromotive forces relating to the Karman vortices $E_v$ have the same direction. Accordingly, in order to detect only the electromotive forces $E_v$ relating to the Karman vortices, a differential amplifier 6 is used as shown in FIG. 9 to connect the electrodes $C_1$ and $C_2$ to the reversing and non-reversing input terminals of the differential amplifier, respectively, so as to obtain an output signal relating to the variation in $E_v$ alone from an output terminal 7. In this connection, electrode $C_0$ is used as the reference point.

Figure 10:
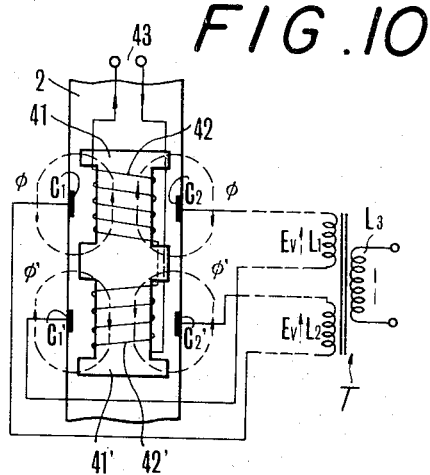
FIG. 10 shows an electrical connection of still further modification utilizing two pairs of electrodes.
Figure 11:
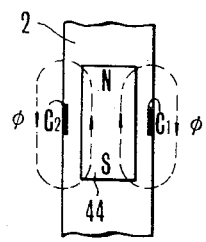
FIGS. 11 through 15 show examples of simplified magnetic field generating means.
Figure 12:
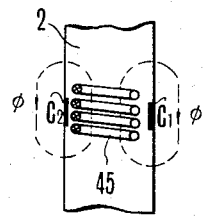
Figure 13:
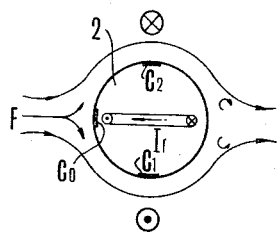
Figure 14:
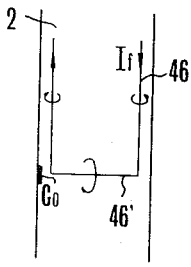
Figure 15:
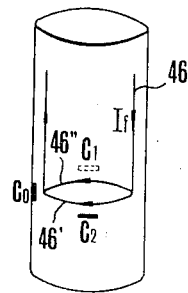

Although in the embodiments shown in FIGS. 5 and 9, the electromotive forces $E_m$ are cancelled with each other by electrical circuits, in the embodiment shown in FIG. 10 another pair of electrodes $C'_1$ and $C'_2$ are provided in the vicinity of electrodes $C_1$ and $C_2$ and a magnetic flux $\phi'$ opposite to magnetic flux $\phi$ is caused to act upon the electrodes $C'_1$ and $C'_2$. The electromotive forces of electrodes $C_1$ and $C'_2$ are impressed across the primary winding $L_2$ of a transformer T, whereas the electromotive forces of electrodes $C'_1$ and $C_2$ across the other primary winding $L_1$ of the same transformer for cancelling out the electromotive forces related to the mean velocity thereby producing the sum of the signals $E_v$ relating to the Karman vortices across the secondary winding $L_3$. In FIG. 10, 41 and 41' show magnetic cores carrying coils 42 and 42' for producing fluxes $\phi$ and $\phi'$ in the opposite directions.

FIGS. 11 through 15 show more simplified magnetic field generating means. In the embodiment shown in FIG. 11, a simple permanent magnet 44 is used and in FIG. 12 a coil 45 alone is used and no magnetic core is provided. In the embodiment shown in FIGS. 13 and 14, a letter U shaped loop coil 46 is disposed in rod 2 near the electrodes, in which case the magnetic flux generated by the bottom portion 46' which is parallel with a plane containing electrodes $C_0$, $C_1$ and $C_2$ is used. In the example shown in FIG. 15, the bottom portions 46' and 46" of the coil are formed as a circle to increase magnetic flux $\phi$ generated thereby.

Figure 16:
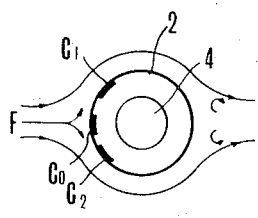
FIGS. 16 and 17 show modified arrangements of the electrodes.
Figure 17:
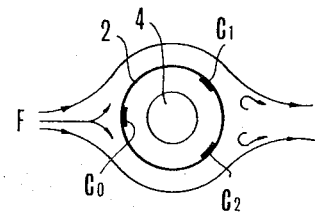

FIGS. 16 and 17 show modified arrangements of the electrodes. In the example shown in FIG. 16, electrodes $C_1$ and $C_2$ are brought close to electrode $C_0$ on the upstream side whereas in the case of FIG. 17, electrodes $C_1$ and $C_2$ are moved away from electrode $C_0$ on the downstream side. In the arrangement shown in FIG. 17, since the electrodes $C_1$ and $C_2$ are disposed in the dead water region it is possible to increase the sensitivity for the Karman vortices.

It should be understood that the configuration of rod 2 is not limited to cylinder but many other configurations can also be used, for example triangle.

Figure 18:
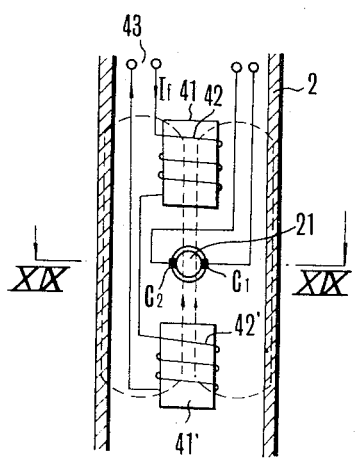
FIG. 18 shows another modification.
Figure 19:
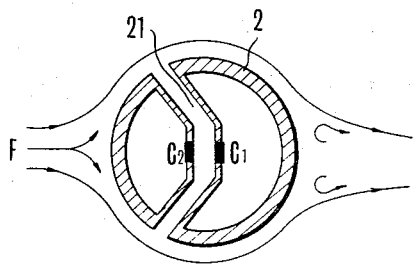
FIG. 19 shows a cross-section of the modification shown in FIG. 18 taken along a line XIX — XIX.

In another embodiment shown in FIGS. 18 and 19 a pressure admission opening 21 is provided in the transverse direction through rod 2 in symmetry with respect to a plane containing the axis of the rod and the axis of the conduit, and opposed electrodes $C_1$ and $C_2$ are provided on the inner wall of the opening 21. Two magnetic cores 41 and 41' and two coils 42 and 42' wound there on are provided to generate magnetic flux $\phi$ through the portion between electrodes $C_1$ and $C_2$ in parallel with the axis of rod 2.

In this embodiment, the variation in the velocity of flow flowing in opposite directions through the opening 21 caused by the Karman vortex is detected by the electrodes $C_1$ and $C_2$. With this arrangement since it is possible to cancel out pressure variations related to the mean flow velocity no electromotive force $E_m$ is created by the mean velocity. Thus, it becomes necessary to detect alone the polarity of the electromotive forces related to the Karman vortex so that it is possible to decrease the required density of the magnetic flux $\phi$, and hence the dimension of rod 2.

The novel flow meter has following advantages.

1. It is possible to produce liquid flow meters of large diameters.

In the prior art Karman vortex flow meter it has been impossible to obtain flow meters of large diameters due to stability. The novel meter is more stable than the prior art Karman vortex flow meter. Moreover, the cost of the flow meter is substantially independent of the diameter so that the invention can be more advantageously applied to larger diameters.

2. It is possible to obtain stable flow meters.

Since the flow meter digitally detects the flow quantity its sensitivity is not affected by the contaminants contained in the liquid.

3. It is possible to manufacture the converter at low cost.

Since the novel flow meter does not detect the magnitude of the electromotive force, its input impedance may be lower than the electromagnetic flow meter. Further, as the operation of the novel flow meter is not affected by the variation in the source voltage it is necessary to perform a ratio computation thereby decreasing further the cost of the converter.

4. The operation of the novel flow meter is not affected by non-uniform distribution of conductivity because the flow meter digitally detects independently of the magnetomotive forces.

5. The operation of the novel flow meter is independent of the temperature. In almost all of the prior art Karman vortex flow meter, temperature sensitive elements are used so that their operating temperatures are limited. Since the novel flow meter electromagnetically detects the Karman vortices there is no limitation caused by the temperature.

6. The novel flow meter is corrosion resistant. The detector can be made of a block of a highly corrosion resistant insulator such as Teflon or Diflon. Moreover detector electrodes may be made of corrosion resistant metal such as platinum. The rod may be made corrosion resistant by applying a Teflon coating. Commercial available Karman vortex flow meter decreases its corrosion resistance at the contact of the temperature sensitive element.

7. The reliability of the novel flow meter is high because it does not include any mechanical moving part.

8. Where the flow meter is used as an alarming device the formation and disappearance of the Karman vortices may be more or less non-linear. In such an application presence of contaminants in the fluid does not affect the sensitivity.

I claim:

1. In a flow meter of the type wherein a rod is inserted in fluid to be measured said rod adapted to create Karman vortices in said fluid and a signal related to the vortices is detected to measure the flow velocity of the fluid, the improvement which comprises means contained in said rod for generating magnetic flux in the direction of the axis of said rod which flux extends into said fluid, a pair of electrodes mounted on the surface of said rod in contact with said fluid for coupling to the electromotive forces caused by motion of said rod through said fluid including the variations in the velocity of said fluid relative to said electrodes caused by the Karman vortices created near said rod, and detector means coupled to said electrodes and responsive to said electromotive forces caused by the Karman vortices but substantially insensitive to electromotive forces caused by means flow velocity past said rod for producing a flow velocity signal.

2. The flow meter according to claim 1 wherein said fluid is passed through a conduit, said rod is inserted in said conduit in perpendicular to the direction of flow of said fluid and said electrodes are mounted on said rod along a line perpendicular to the axis of said rod and to the direction of flow of said fluid.

3. The flow meter according to claim 1 wherein said magnetic flux generating means comprises a magnetic core coaxially contained in said rod and an exciting coil wound about said core.

4. The flow meter according to claim 1 wherein said magnetic flux generating means comprises a pair of magnetic cores arranged side by side in said rod in parallel with the axis thereof and a pair of coils wound in series opposition on said cores.

5. The flow meter according to claim 1 wherein said magnetic field generating means comprises a magnetic core disposed in said rod in the axial direction thereof and a pair of coils wound on said core and connected in series opposition.

6. The flow meter according to claim 1 wherein said magnetic flux generating means comprises a bar shaped permanent magnet in parallel with the axis of said rod between said electrodes.

7. The flow meter according to claim 1 wherein said magnetic flux generating means comprises a coil disposed in said rod for generating magnetic flux in parallel with said rod.

8. The flow meter according to claim 1 wherein said magnetic field generating means comprises a letter U-shaped loop conductor contained within said rod.

9. The flow meter according to claim 2 wherein said pair of electrodes are mounted on the surface of said rod on the upstream side with respect to the flow of said liquid.

10. The flow meter according to claim 2 wherein said pair of electrodes are mounted on the surface of said rod on the downstream side with respect to the flow of said liquid.

11. The flow meter according to claim 2 wherein a lateral opening is formed through said rod and said pair of electrodes are formed on the inner wall of said opening in contact with said fluid.

* * * * *